(12) United States Patent
Laursen

(10) Patent No.: US 8,464,984 B2
(45) Date of Patent: Jun. 18, 2013

(54) CABLE MANAGEMENT GUIDE

(75) Inventor: Erik Laursen, Kirkland, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 207 days.

(21) Appl. No.: 11/924,444

(22) Filed: Oct. 25, 2007

(65) Prior Publication Data

US 2008/0099635 A1    May 1, 2008

Related U.S. Application Data

(60) Provisional application No. 60/862,963, filed on Oct. 25, 2006.

(51) Int. Cl.
    *A47F 5/00*    (2006.01)
(52) U.S. Cl.
    USPC .......................... 248/68.1; 248/67.7; 211/26
(58) Field of Classification Search
    USPC ............... 248/74.1, 74.2, 74.4, 65, 67.7, 68.1
    See application file for complete search history.

(56) References Cited

U.S. PATENT DOCUMENTS

| | | |
|---|---|---|
| 3,890,459 A | 6/1975 | Caveney |
| 3,968,322 A | 7/1976 | Taylor |
| 4,641,225 A | 2/1987 | Reichle |
| 5,765,698 A * | 6/1998 | Bullivant ........................ 211/26 |
| 5,806,811 A * | 9/1998 | Viklund et al. ................. 248/49 |
| 5,921,402 A * | 7/1999 | Magenheimer ................. 211/26 |
| 6,102,214 A | 8/2000 | Mendoza |
| 6,427,952 B2 * | 8/2002 | Caveney et al. ............. 248/68.1 |
| 6,467,633 B1 | 10/2002 | Mendoza |
| D473,449 S * | 4/2003 | Wu et al. ........................ D8/356 |
| 6,572,058 B1 * | 6/2003 | Gerardo ...................... 248/74.2 |
| 6,636,680 B2 * | 10/2003 | Wu et al. ....................... 385/137 |
| 6,946,605 B2 * | 9/2005 | Levesque et al. ............. 174/100 |
| 7,026,553 B2 * | 4/2006 | Levesque et al. ............. 174/100 |
| 7,119,282 B2 * | 10/2006 | Krietzman et al. ........... 174/101 |
| 7,259,325 B2 * | 8/2007 | Pincu et al. ..................... 174/50 |

* cited by examiner

*Primary Examiner* — Terrell McKinnon
*Assistant Examiner* — Steven Marsh
(74) *Attorney, Agent, or Firm* — Davis Wright Tremaine LLP; George C. Rondeau, Jr.; Heather M. Colburn

(57) ABSTRACT

A cable management guide couples with a component rack to support and guide cables. The cable management guide has offset brackets attachable to posts of the component rack to unobtrusively position cable stays into the interior of the component rack for enhanced positioning of the cables. Each of the cable stays includes a support member to retain one or more cables and a guard member that keeps the cables on the support member within the cable stay. For each cable stay, the guard member is offset from and overlaps with the support member to provide an entrance gap between the support member and the guard member for cables to be slipped into and out of the cable stay.

24 Claims, 10 Drawing Sheets

CABLE MANAGEMENT GUIDE

CROSS REFERENCE TO RELATED APPLICATION

This application claims priority benefit of provisional application Ser. No. 60/862,963 filed Oct. 25, 2006, the content of which is incorporated in its entirety.

BACKGROUND OF THE INVENTION

1. Field of the Invention

The present invention relates generally to the field of cable management.

2. Description of the Related Art

Conventional equipment racks support a multitude of components, each generally having their own complement of cables to manage. Unfortunately, the need for supporting and routing cables can be quite challenging.

BRIEF DESCRIPTION OF THE SEVERAL VIEWS OF THE DRAWING(S)

DETAILED DESCRIPTION OF THE INVENTION

Figure 1:
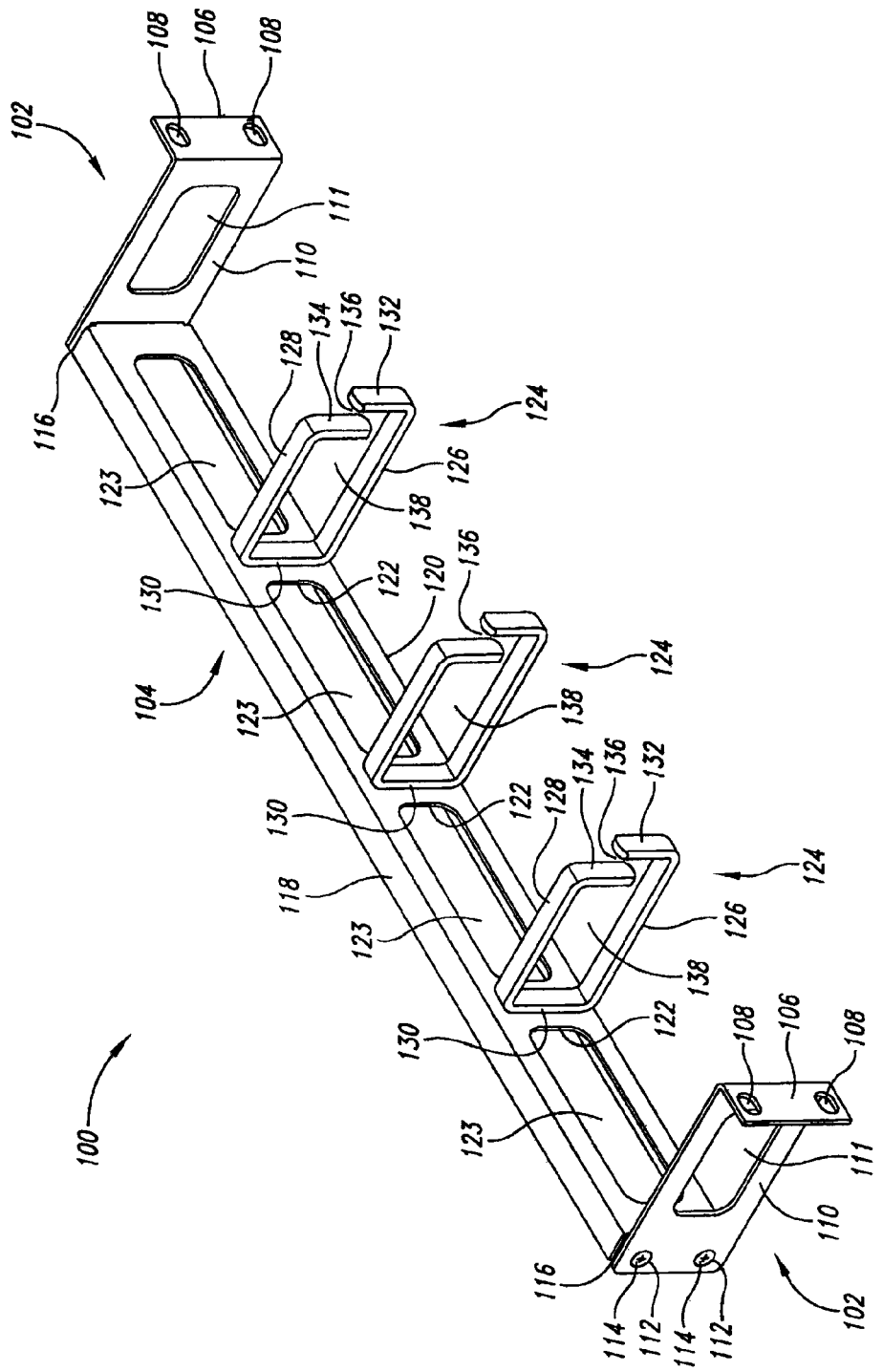
FIG. 1 is a first perspective view of a first implementation of a cable management guide according to the present invention.

A cable management guide according to the present invention couples with a component rack to be readily accessible to support and guide cables attached to components in the rack or otherwise in the vicinity of the component rack. The cable management guide has offset brackets attachable to posts of the component rack to unobtrusively position cable stays into the interior of the component rack for enhanced positioning of the cables.

Each of the cable stays includes a support member to retain one or more cables and a guard member that keeps the cables on the support member within the stay. For each cable stay, the guard member is offset to overlap with the support member to provide an entrance gap between the support member and the guard member. Cables can be slipped into and out of the stay without the need for latching and unlatching or other type of mechanical adjustment of the stays, which would otherwise require additional manual steps for securing the cables in the cable management guide.

A first implementation of the cable management guide 100 is shown in FIGS. 1-4 to include two end brackets 102 with an elongated back member 104 extending therebetween. Each of the brackets 102 includes a rack engagement portion 106 with holes 108 to receive bolts or screws for coupling with a post of a component rack, usually at a face thereof. Each of the brackets 102 further includes a side portion 110 that extends between the rack portion 106 and the back member 104. The side portion has an opening 111 that provides access. The side portion 110 further has holes 112 to receive bolts 114 for coupling each side portion 110 to a different end 116 of the back member 104.

Other implementations may use other methods of attachment, such as welding, or may use single formed piece construction. The back member 104 includes an upper first horizontal member 118 and a lower second horizontal member 120, and a plurality of vertical members 122 extending therebetween to bound openings 123 to provide access. In the depicted implementation, a cable stay 124 extends forward from each of the vertical members 120 although in other implementations the cable stays 124 can extend from another form of the back member 104 in another manner conducive to the particular form of the back member.

Each of the cable stays 124 includes an elongated lower first stay member 126 and an elongated upper second stay member 128 with a vertical member 130 extending therebetween. Both the first stay member 126 and the second stay member 128 horizontally extend forward from the vertical member 130 which is positioned at a forward surface of the back member 104. As depicted, the first stay member 126 serves as the support member and extends below the second stay member 128 which serves as the guard member. In other implementations the cable management guide 100 may be coupled into a component rack in an inverted position so that the first stay member 126 extends as the guard member above the second stay member 128 as the support member. As the support member shown in the drawings, the first stay member 126 receives cables to rest thereon. As the guard member, the second stay member 128 keeps the cables from slipping or lifting off of the first stay member 126.

To further retain cables in the cable stay 124, a first vertical member 132 extends from the first stay member 126 and a second vertical member 134 extends from the second stay member 128, and is positioned in spaced apart positions to define an entrance gap 136 therebetween. The free end portions of the first and second vertical members 132 and 134 overlap, with the free end portion of the second vertical member 134 spaced rearward of the free end portion of the first vertical member 132 to define an upwardly facing opening forward of the second vertical member. The first stay member 126, the second stay member 128, the first vertical member 132, and the second vertical member 134 serve to bound a containment area 138 to retain cables in the cable stay 124.

The first vertical member 132 and the second vertical member 134 extend in a same substantially vertically oriented plane. The first vertical 132 member and the second vertical member 134 also sufficiently extend to cut through a same horizontally oriented plane. Cables are laterally slipped into the containment area 138 of the cable stays 124 and laterally removed through the entrance gap 136. The entrance gap 136 can be sized to accommodate various diameter sizes of the cables, but is generally large enough to allow for individual cables to be readily slipped into and out of the containment area 138 of the cable stay 124 while being small enough to minimize accidental release of cables from the cable stays.

Figure 2:
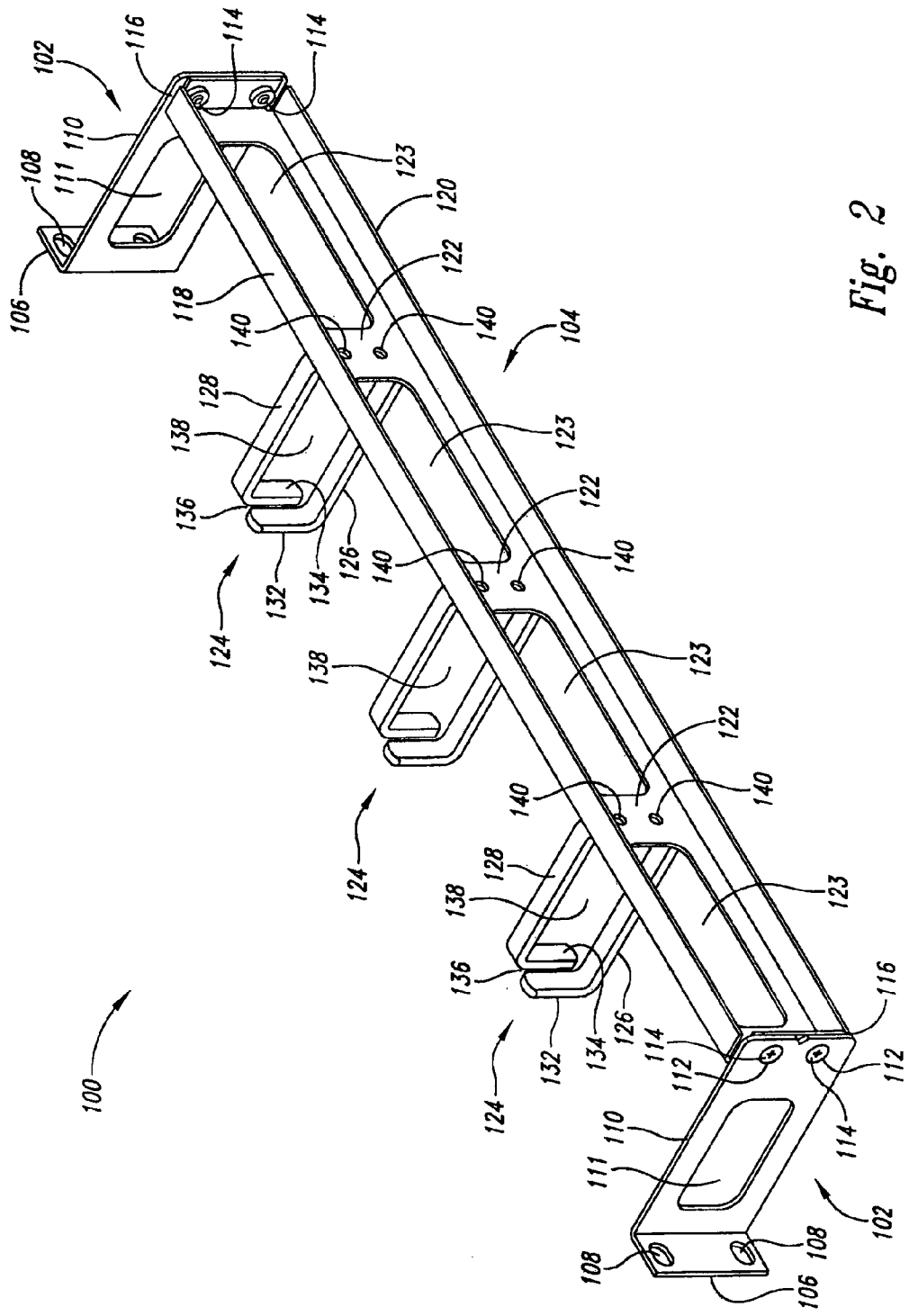
FIG. 2 is a second perspective view of the cable management guide of FIG. 1.
Figure 3:
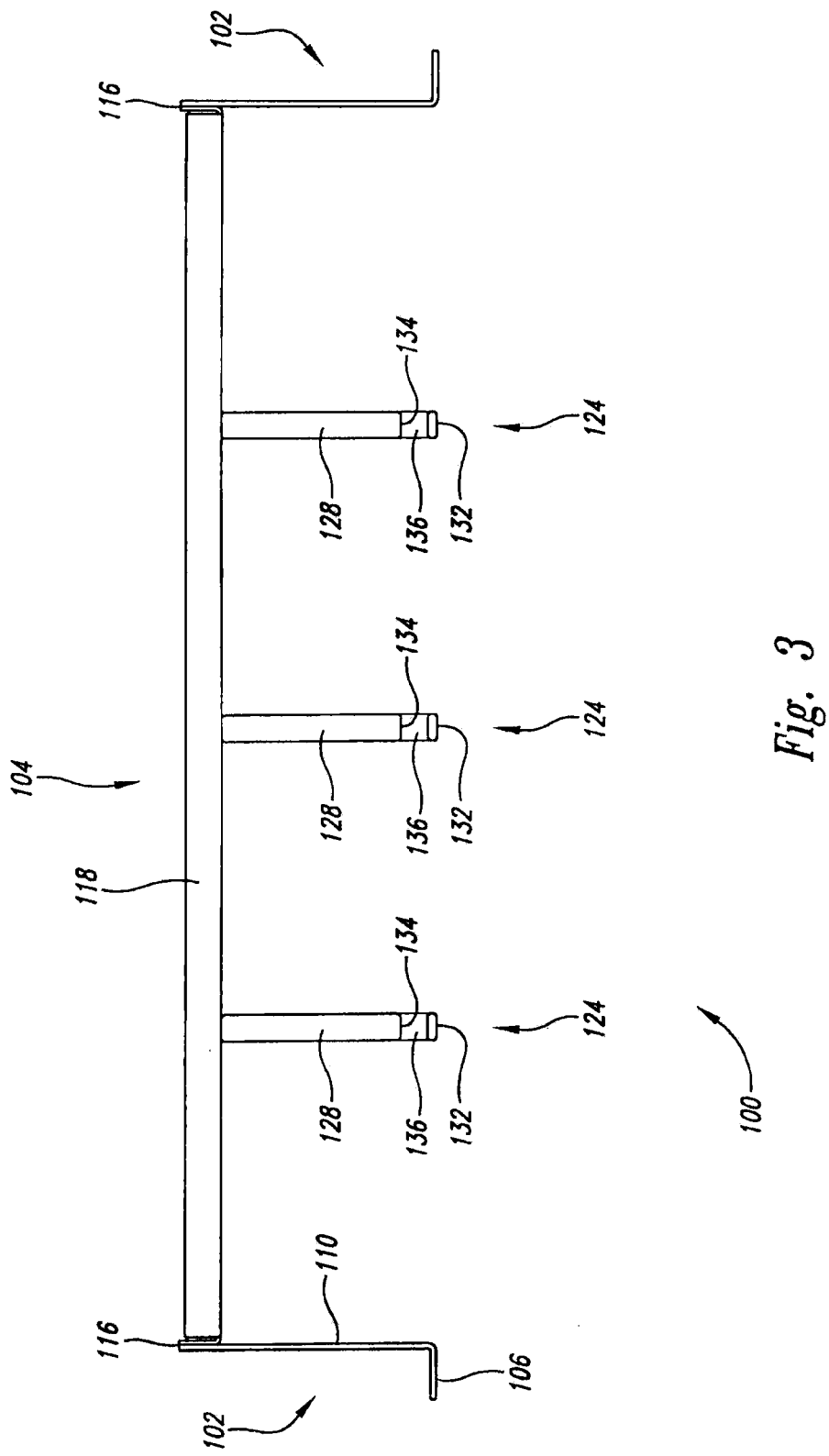
FIG. 3 is a top plan view of the cable management guide of FIG. 1.

As shown in FIG. 2, each of the cable stays 124 can be fastened to a different one of the vertical members 122 with screws 140, but in other implementations the cable stays can be fastened by other means such as welding or through being formed as a single integral piece with other members of the cable management guide 100. FIG. 3 shows a top plan view of the first implementation of the cable management guide 100.

Figure 4:
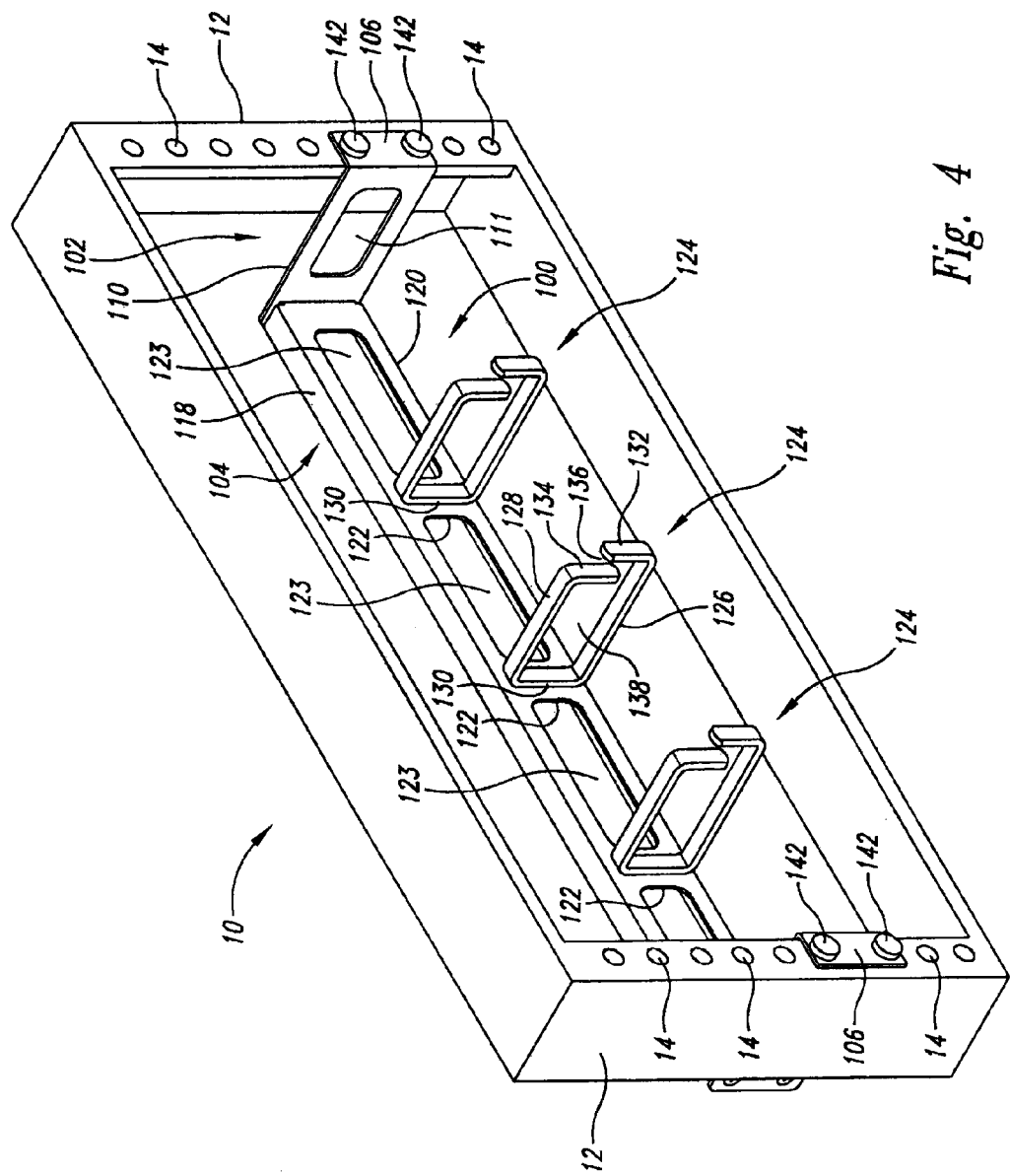
FIG. 4 is a first perspective view of the cable management guide of FIG. 1 shown positioned in a component rack.
Figure 5:
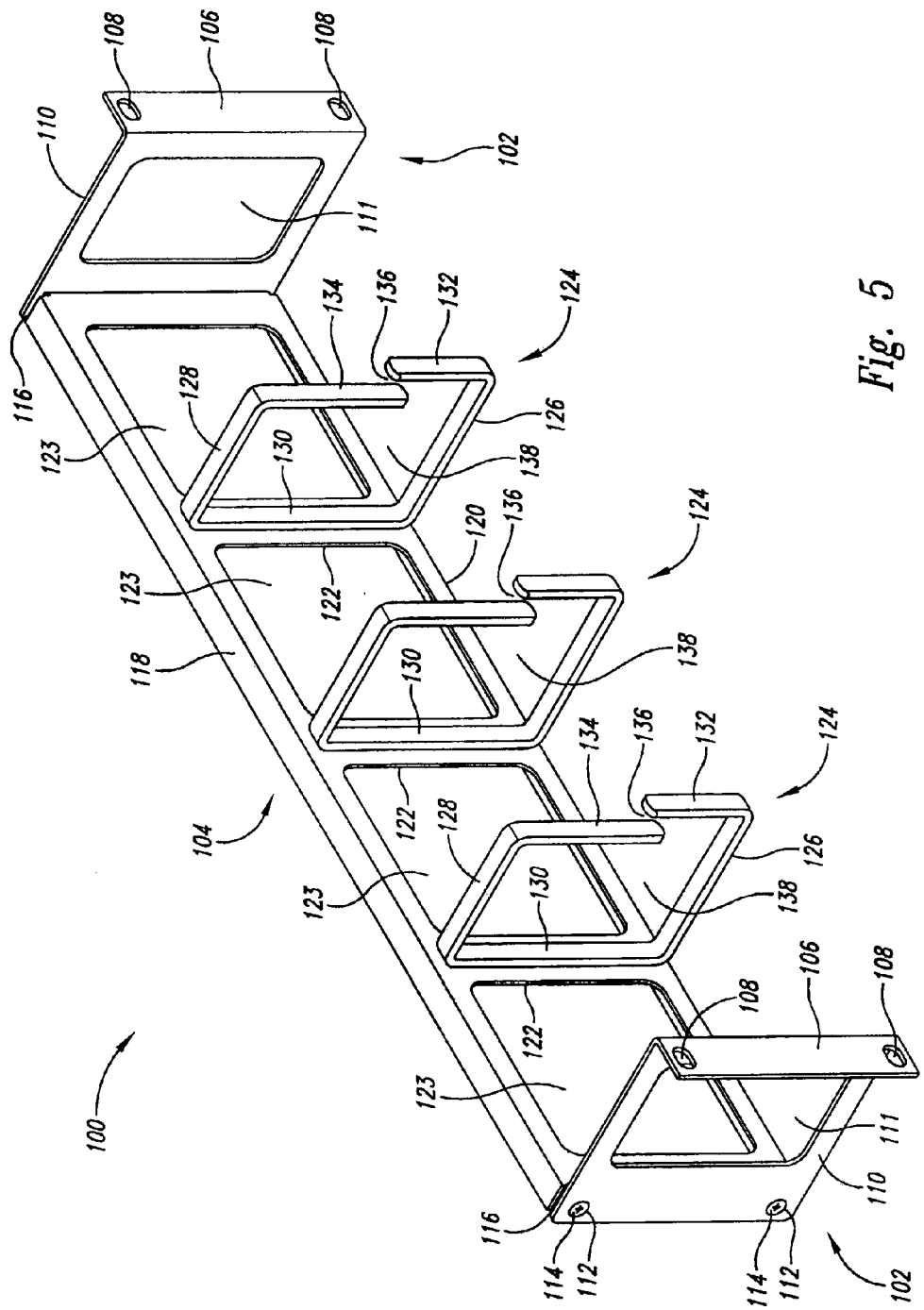
FIG. 5 is a first perspective view of a second implementation of a cable management guide according to the present invention.
Figure 6:
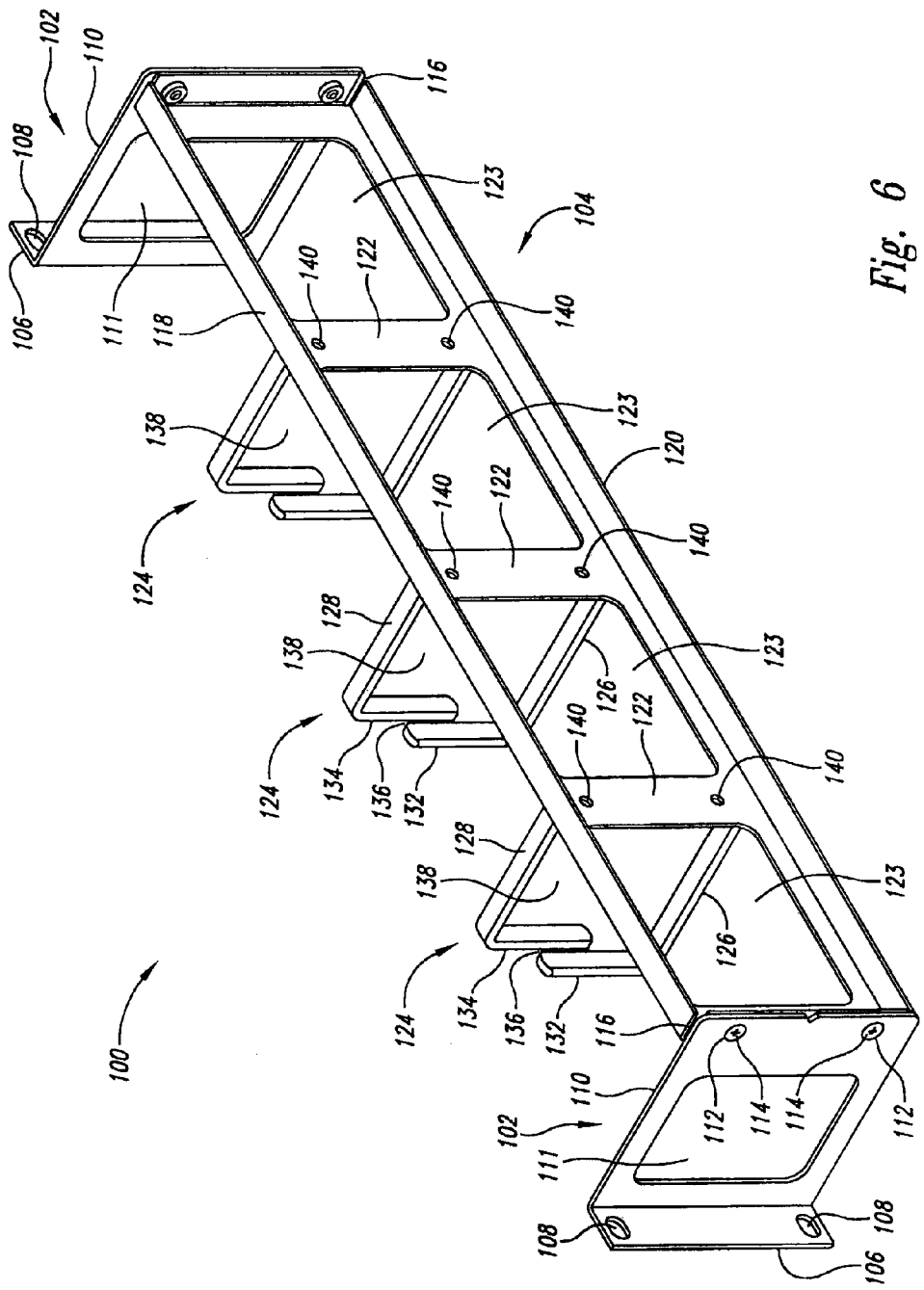
FIG. 6 is a second perspective view of the cable management guide of FIG. 5.
Figure 7:
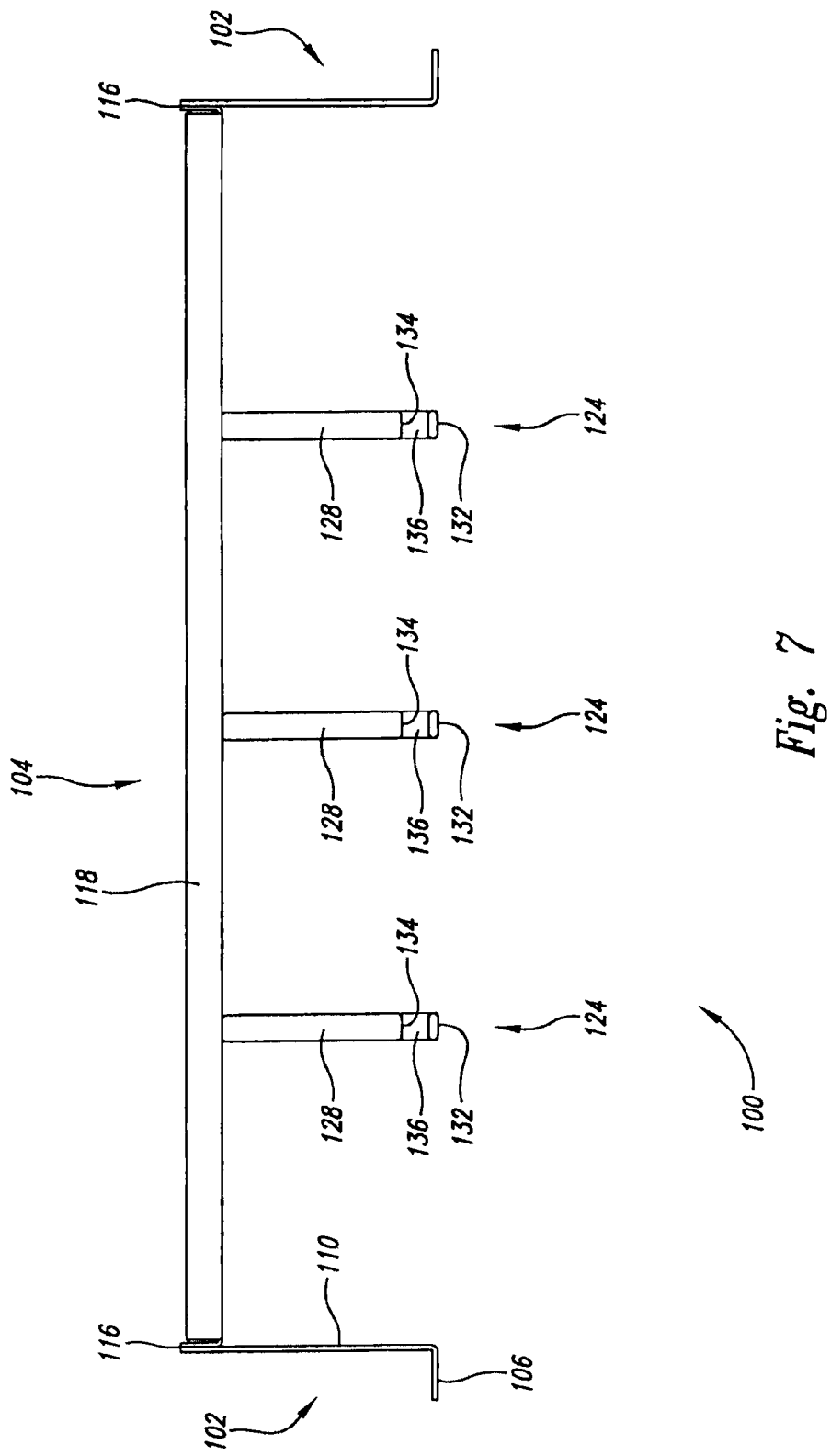
FIG. 7 is a top plan view of the cable management guide of FIG. 5.
Figure 8:
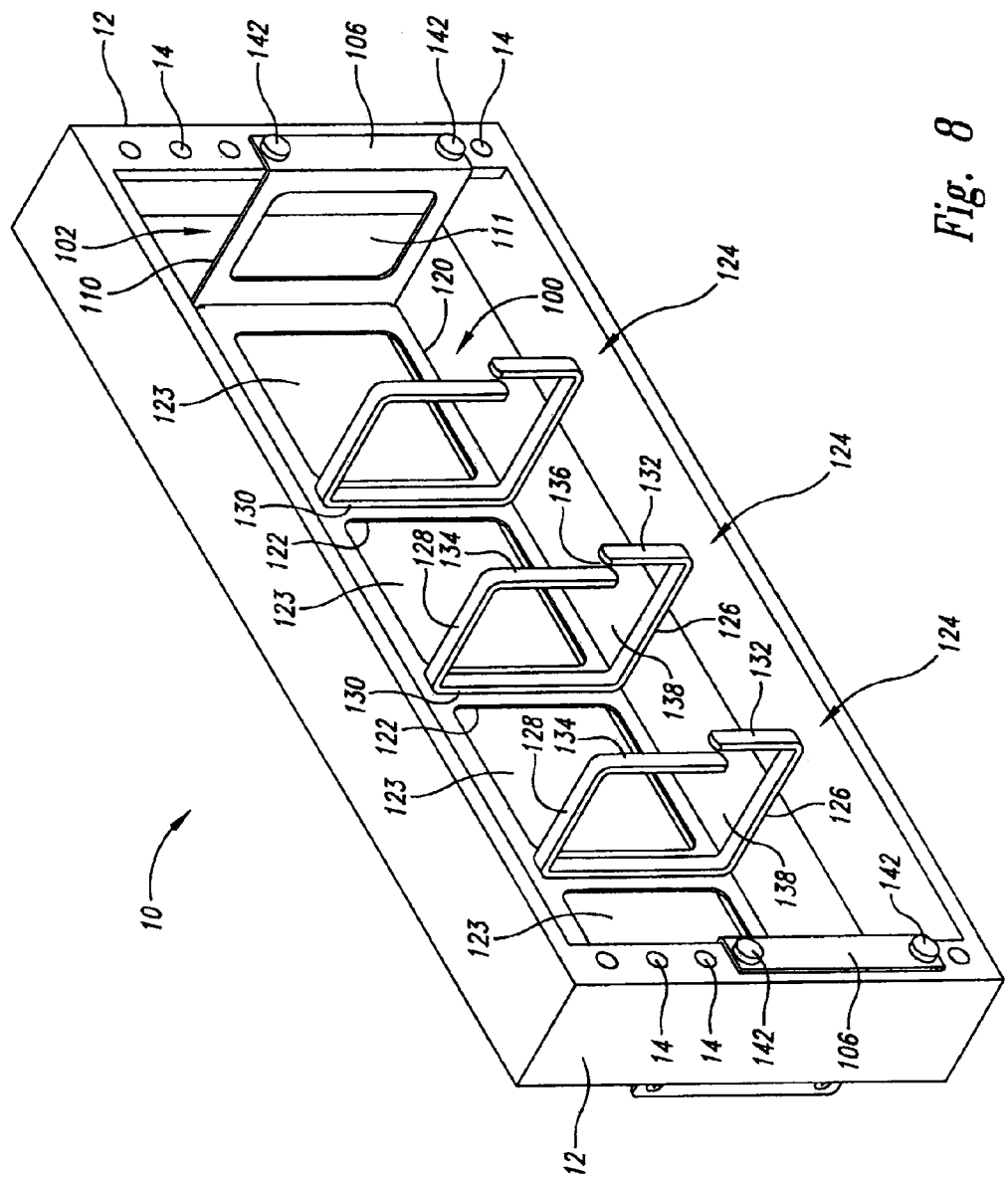
FIG. 8 is a first perspective view of the cable management guide of FIG. 5 shown positioned in a component rack.

The first implementation of the cable management guide 100 is shown in FIG. 4 attached to a component rack 10 extending between vertically oriented elongated posts 12 of the component rack. The cable management guide 100 is attached to the component rack 10 with bolts 142 passing through the holes 108 (shown in FIG. 1) of the rack engagement portions 106 of, the brackets 102 and through holes 14 of the component rack 10.

A second implementation of the cable management guide 100 is shown in FIGS. 5-8 in which the vertical members 122 of the back member 104 and the vertical member 130 of each of the cable stays 124 are larger than depicted with the first implementation to accommodate more cables.

Figure 9:
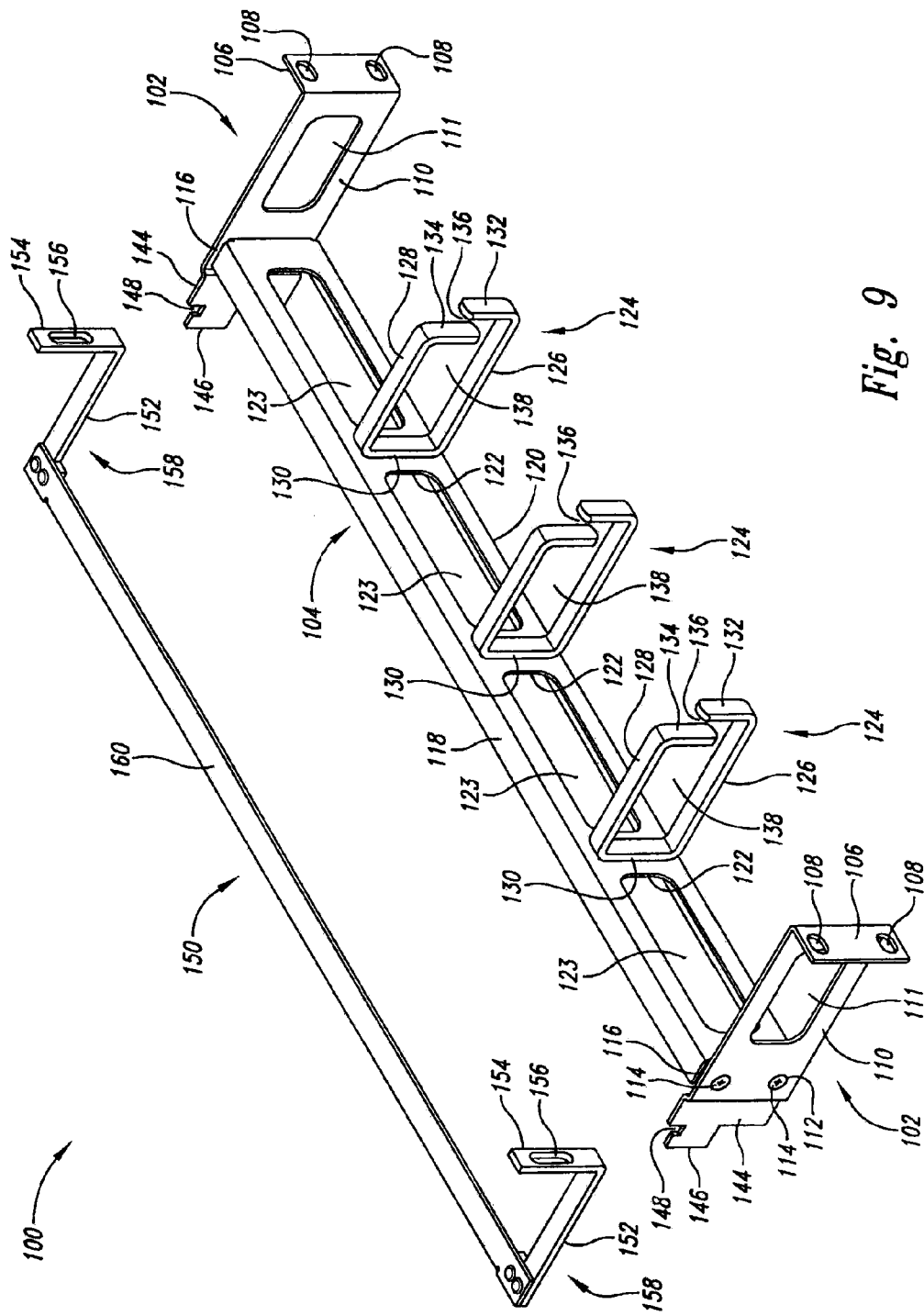
FIG. 9 is a perspective view of an implementation of the cable management guide having an additional support bar shown detached from the cable management guide.
Figure 10:
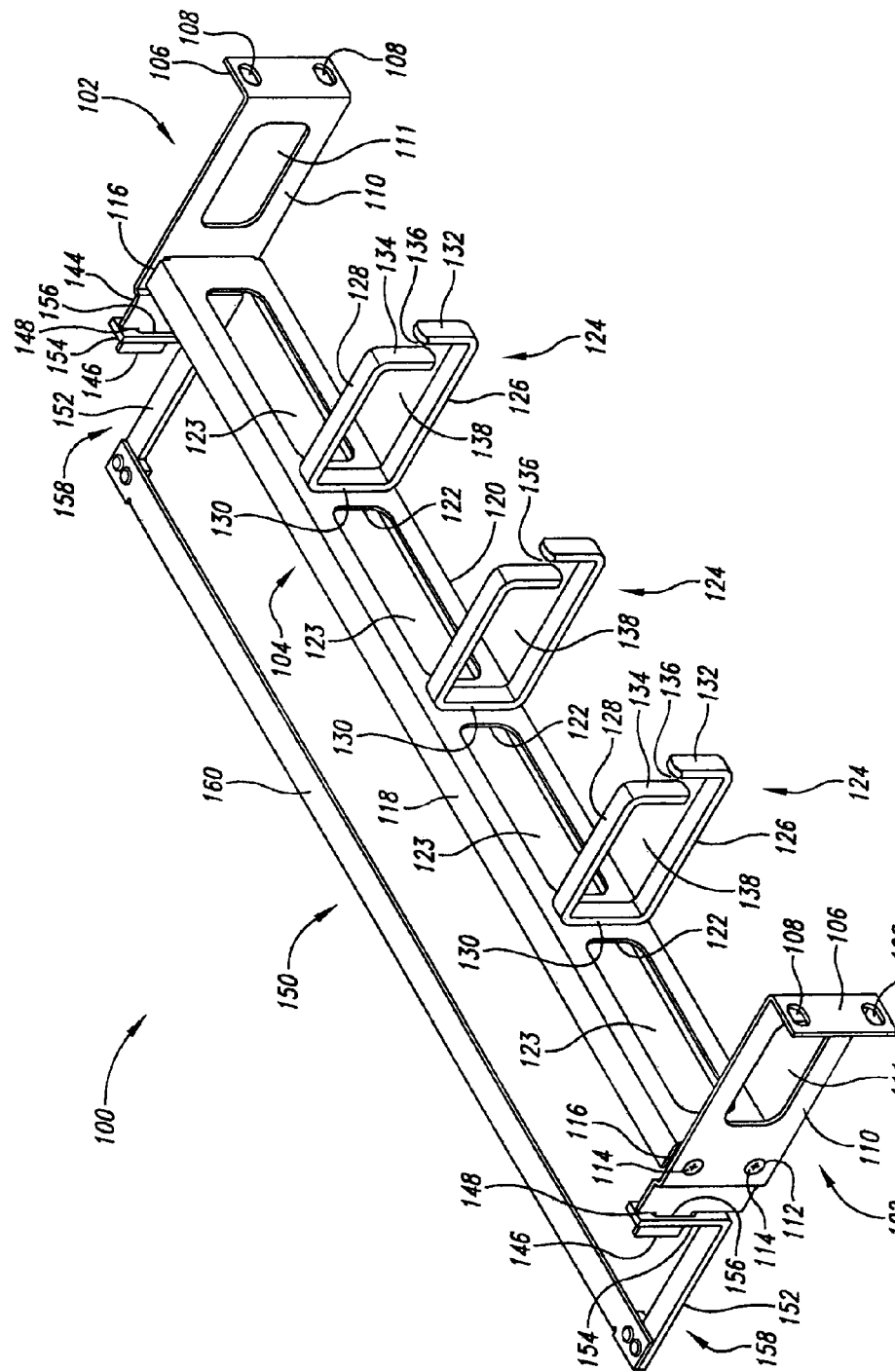
FIG. 10 is a perspective view of an implementation of the cable management guide having an additional support bar shown attached to the cable management guide.

An implementation of the cable management guide 100 is shown in FIG. 9 as having a version of the two brackets 102 each having a side portion 144 extending away from the side portion 110 of the bracket. The side portion 144 includes an engagement end 146 with a notch 148. The depicted implementation has a support bar 150 with two L-brackets 152 each having a vertical portion 154 with a slot 156 for coupling with the notch 148 of the engagement end 146 of a different one of the two brackets 102. Each of the L-brackets 152 further includes a horizontal portion 158 that extends in a direction opposite to the extension direction of the side portion 110 of the bracket 102 that the L-bracket is attached thereto. The support bar 150 further includes a cross member 160 that extends between the two horizontal portions 158.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention.

Accordingly, while the present invention has been described herein in detail in relation to an implementation, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

It is claimed:

1. A cable management guide for a component rack having a first vertically oriented elongated post, and a second vertically oriented elongated post, the cable management guide comprising:
    a first bracket having a first opening configured to allow one or more cables to pass therethrough;
    a second bracket having a second opening configured to allow one or more cables to pass therethrough;
    an elongated back member comprising a plurality of attachment portions, and an opening positioned between adjacent ones of the plurality of attachment portions to provide a passageway through the elongated back member, the back member being sized to be coupled by the first bracket to the first vertically oriented elongated post at a first coupling location, the back member being further sized to be coupled by the second bracket to the second vertically oriented elongated post at a second coupling location to position the plurality of attachment portions of the back member away from the first and second coupling locations in a first direction, the first and second openings being spaced apart from the first and second coupling locations, respectively, along the first direction when the back member is coupled to the first and second vertically oriented elongated posts by the first and second brackets, respectively; and
    a plurality of cable stays, each of the cable stays extending from at least one of the plurality of attachment portions of the back member in a second direction substantially opposite to the first direction, the first and second openings being spaced apart from the back member along the second direction such that each of the cable stays is aligned with the first and second openings when the back member is coupled to the first and second vertically oriented elongated posts by the first and second brackets, respectively, each of the plurality of cable stays including an elongated first stay member and an elongated second stay member, the first stay member having a first extension portion extending away from a first position on the back member and a first free end portion positioned away from the back member, the second stay member having a second extension portion extending away from a second position on the back member and a second free end portion positioned away from the back member, the first position being spaced from the second position, the first and second free end portions of the first and second stay members being positioned to define a gap therebetween.

2. The cable management guide of claim 1 wherein when the cable management guide is coupled with the component rack, the first extension portion of the first stay member is positioned below the second extension portion of the second stay member, and the first free end portion of the first stay member extends substantially vertically upward, and the second free end portion of the second stay member extends substantially vertically downward.

3. The cable management guide of claim 2 wherein when the cable management guide is coupled with the component rack, the first free end portion of the first stay member and the second free end portion of the second stay member extend in a same substantially vertically oriented plane, and extend through a same horizontally oriented plane.

4. The cable management guide of claim 1 wherein when the cable management guide is coupled with the component rack, the first extension portion of the first stay member and the second extension portion of the second stay member extend horizontally, and the first extension portion of the first stay member is positioned directly below the second extension portion of the second stay member.

5. The cable management guide of claim 1 wherein when the cable management guide is coupled with the component rack, the back member further comprises:
    an elongated first horizontal member;
    an elongated second horizontal member spaced apart from and positioned above the first horizontal member; and
    a plurality of vertical members extend between the first and second horizontal members, each of the plurality of vertical members comprising at least one of the plurality of attachment portions of the back member, each of the cable stays extending from a different one of the vertical members.

6. The cable management guide of claim 1 wherein each of the cable stays further includes a vertical attachment member coupled to at least one of the plurality of attachment portions of the back member, the first extension portion of the first stay member and the second extension portion of the second stay member being attached to the vertical attachment member.

7. A cable management guide for a component rack having first and second vertically oriented elongated posts, the cable management guide comprising:
a first bracket having a first side portion and a first rack engagement portion, the first side portion comprising a first opening configured to allow one or more cables to pass therethrough, the first rack engagement portion being couplable to the first post of the component rack;
a second bracket having a second side portion and a second rack engagement portion couplable to the second post of the component rack;
a back member extending between the first and second brackets, the back member comprising a plurality of through-holes;
a plurality of cable stays each comprising an attachment member coupled to the back member between a different pair of the plurality of through-holes, each cable stay including a first stay member with an elongated first extension portion and a second stay member with an elongated second extension portion, the first and second extension portions being spaced apart and extending substantially parallel to each other,
when the cable management guide is coupled to the component rack, the first side portion of the first bracket extending from the first rack engagement portion coupled to the first post in substantially a first direction, the second side portion of the second bracket extending from the second rack engagement portion coupled to the second post in substantially the first direction, and the first and second extension portions of the cable stays extending substantially along a second direction opposite the first direction from positions spaced from the first and second rack engagement portions along the first direction, the first opening being spaced apart from the back member along the second direction and aligned with the plurality of cable stays.

8. The cable management guide of claim 7 wherein each of the cable stays further includes a first vertical member and a second vertical member, when the first rack engagement portion of the first bracket is coupled to the first post of the component rack and the second rack engagement portion of the second bracket is coupled to the second post of the component rack, the first extension portion extending substantially horizontally to a first end thereof with the first vertical member extending substantially vertically therefrom toward the second extension portion, and the second extension portion extending substantially horizontally to a second end thereof with the second vertical member extending substantially vertically therefrom toward the first extension portion, the first vertical member and the second vertical member extend in a same substantially vertically oriented plane and overlap each other in a spaced apart relation to form a cable entrance gap.

9. The cable management guide of claim 7, further including a cross bar connected to the first and second posts of the component rack, when connected to the component rack, the cross bar positioned from the first and second posts of the component rack in the second direction.

10. The cable management guide of claim 7 wherein the first side portion of the first bracket comprises one or more openings each configured to receive a fastener configured to couple the first bracket to the back member, and the second side portion of the second bracket comprises one or more openings each configured to receive a fastener configured to couple the second bracket to the back member.

11. The cable management guide of claim 7, wherein the first extension portion of the stay member and the second extension portion of the stay member are each attached to the attachment member.

12. A cable management guide for use with a component rack having first and second rack posts arranged in a rack plane, comprising:
a first bracket having a first side portion and a first rack engagement portion, the first side portion comprising a first opening configured to allow one or more cables to pass therethrough, the first rack engagement portion being couplable to the first rack post at the rack plane;
a second bracket having a second side portion and a second rack engagement portion couplable to the second rack post at the rack plane;
a back member comprising a plurality of through-holes, the back member extending between the first and second brackets with the first opening positioned between the first rack engagement portion and the back member, the first bracket and second bracket being shaped to position the back member away from the rack plane when the first rack engagement portion of the first bracket is coupled to the first rack post at the rack plane and the second rack engagement portion of the second bracket is coupled to the second rack post at the rack plane; and
a plurality of cable stays having a bounded cable containment area accessible by a cable entrance gap, the cable containment area being aligned with the first opening, each of the cable stays being coupled with the back member between one of the plurality of through-holes and another of the plurality of through-holes, and each of the cable stays extending from the back member toward the rack plane when the first rack engagement portion of the first bracket is coupled to the first rack post at the rack plane and the second rack engagement portion of the second bracket is coupled to second rack post at the rack plane.

13. The cable management guide of claim 12 wherein each of the cable stays includes a first extension portion and a second extension portion, and further includes a first upright portion and a second upright portion, the first and second extension portions being spaced apart with the second extension portion above the first extension portion and with the first and second extension portions extending from the back member to an end thereof toward the rack plane when the first rack engagement portion of the first bracket is coupled to the first rack post at the rack plane and the second rack engagement portion of the second bracket is coupled to the second rack post at the rack plane, the first upright portion extending from the end of the first extension portion upward toward the second extension portion and the second upright portion extending from the end of the second extension portion downward toward the first extension portion.

14. The cable management guide of claim 13 wherein the first and second upright portions overlap each other in a spaced apart relation to form the cable entrance gap.

15. The cable management guide of claim 13 wherein the second upright portion is positioned inwardly from the first upright portion to define the cable entrance gap with an upward opening, the cable entrance gaps of the cable stays being located toward the rack plane when the first rack engagement portion of the first bracket is coupled to the first rack post at the rack plane and the second rack engagement portion of the second bracket is coupled to the second rack post at the rack plane.

16. The cable management guide of claim 12 wherein the first side portion of the first bracket comprises at least one opening adjacent the back member and spaced apart from each of the first opening, and the first rack post, the at least one opening of the first side portion being configured to receive one or more fasteners configured to couple the first bracket to the back member, and the second side portion of the second bracket comprises a second opening configured to allow one or more cables to pass therethrough, and at least one opening adjacent the back member, the at least one opening of the second side portion being spaced apart from each of the second opening, and the second rack post, the at least one opening of the second side portion being configured to receive one or more fasteners configured to couple the second bracket to the back member.

17. The cable management guide of claim 12 wherein the back member comprises:

an upper member extending between the first and second brackets;
a lower member extending between the first and second brackets and spaced below the upper member; and
a plurality of upright members extending between the upper and lower members, a portion of the plurality of through-holes of the back member being positioned between the upper member, the lower member, and adjacent ones of the plurality of upright members.

18. The cable management guide of claim 17 wherein each of the cable stays extends from a different one of the upright members.

19. A method of providing cable management for a component rack having a first rack post and a second rack post arranged in a rack plane, the method comprising:

coupling a first bracket to the first rack post at a first coupling location, the first bracket having a first opening configured to allow one or more cables to pass therethrough;

coupling a second bracket to the second rack post at a second coupling location, the second bracket having a second opening configured to allow one or more cables to pass therethrough, a back member extending between the first and second brackets, the back member comprising a plurality of attachment portions and a plurality of through-holes, each of the plurality of attachment portions being positioned between one of the plurality of through-holes and a different one of the plurality of through-holes, the first and second brackets positioning the plurality of attachment portions of the back member away from the first and second coupling locations in a first direction, the first and second openings being spaced apart from the first and second coupling locations, respectively, along the first direction; and coupling each of a plurality of cable stays to at least one of the plurality of attachment portions of the back member to extend from the back member in a second direction opposite the first direction, the first and second openings being spaced apart from the back member along the second direction and aligned with each of the plurality of cable stays, each of the plurality of cable stays including a first extension portion and a second extension portion, and further including a first upright portion and a second upright portion, the first and second extension portions being spaced apart with the second extension portion above the first extension portion and with the first and second extension portions extending from the back member to an end thereof toward the rack plane, the first upright portion extending from the end of the first extension portion upward toward the second extension portion and the second upright portion extending from the end of the second extension portion downward toward the first extension portion, the first and second upright portions overlapping each other in a spaced apart relation to form a cable entrance gap, the first and second extension portions and the first and second upright portions defining a bounded cable containment area accessible by the cable entrance gap.

20. The cable management guide of claim 7 wherein the first side portion comprises a plurality of openings each spaced apart from the first opening, each of the plurality of openings of the first side portion being configured to receive a fastener, the first rack engagement portion comprises at least one opening configured to receive a fastener to couple the first bracket to the first post of the component rack,
the second side portion comprises a plurality of openings, each of the plurality of openings of the second side portion being configured to receive a fastener,
the second rack engagement portion comprises at least one opening configured to receive a fastener to couple the second bracket to the second post of the component rack, and
the back member is coupled to the first bracket by a first plurality of fasteners and to the second bracket by a second plurality of fasteners, each of the first plurality of fasteners being received inside one of the plurality of openings of the first side portion of the first bracket, and each of the second plurality of fasteners being received inside one of the plurality of openings of the second side portion of the second bracket.

21. The cable management guide of claim 7 wherein at least a section of each of the first extension portions of the cable stays extends between the first side portion of the first bracket and the second side portion of the second bracket substantially in the second direction.

22. The cable management guide of claim 21 wherein at least a section of each of the second extension portions of the cable stays extends between the first side portion of the first bracket and the second side portion of the second bracket substantially in the second direction.

23. The cable management guide of claim 7 wherein the second side portion comprises a second opening configured to allow one or more cables to pass therethrough, and the second opening is spaced apart from the back member along the second direction.

24. The cable management guide of claim 12 wherein the second side portion comprises a second opening configured to allow one or more cables to pass therethrough, and the second opening is positioned between the second rack engagement portion and the back member.

* * * * *